United States Patent Office 3,448,120
Patented June 3, 1969

3,448,120
PROCESS FOR THE PREPARATION OF ALKYLENE DITHIOCARBONATES
Genevieve Lebrasseur, born Nicoud, Bully-les-Mines, France, assignor to Ethylene-Plastique, Paris, France, a French society
No Drawing. Filed Dec. 20, 1966, Ser. No. 603,125
Claims priority, application Great Britain, Dec. 23, 1965, 54,569/65
Int. Cl. C07d 95/00
U.S. Cl. 260—327                     9 Claims

ABSTRACT OF THE DISCLOSURE

A process is provided for the preparation of alkylene dithiocarbonates wherein carbon disulfide is reacted with an alkylene oxide at a temperature of from 10 to 70° C. in the presence of at a catalytic system. The catalytic system contains an alkali metal halide such as lithium, sodium or potassium iodide, lithium or sodium bromide or lithium chloride, between 2 and 12% by weight water based on the amount of alkali metal halide present and a co-catalyst. The co-catalyst may be a compound such as a sulfonium halide, a xanthate, hydrogen sulfide, an alkali metal sulfide, a thiocarbonate or an alcohol.

---

This invention relates to a process for the preparation of alkylene dithiocarbonates by the reaction of carbon disulfide and alkylene oxides.

The reaction of an alkylene oxide (ethylene oxide, propylene oxide, etc.) and carbon disulfide has been studied by a number of authors, but whether the reaction is uncatalysed or is catalysed with an amine, a complex mixture is obtained in every case which contains not only an alkylene dithiocarbonate, but also the corresponding alkylene monothiocarbonate, the corresponding alkylene trithiocarbonate, the corresponding alkylene sulfide and, usually, numerous by-products arising from the partial polymerization of the alkylene sulfide or the alkylene oxide starting material. The preparation of an alkylene dithiocarbonate in the concentrated state and with a good yield therefore requires the use of a catalyst sensitive enough to provide effective control of the reaction of alkylene oxide and carbon disulfide.

The formation of alkylene dithiocarbonate by the reaction of these starting materials can generically be written as follows:

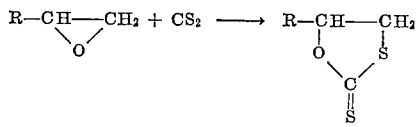

where R is H or $CH_3$ or a lower alkyl radical or an aryl or cycloalkyl radical. This reaction is very difficult to carry out, however, because during the intermediate reactions which lead to the formation of the alkylene dithiocarbonate or after the formation of the dithiocarbonate itself, the reaction medium offers numerous possibilities for secondary reactions which usually result in a complex mixture from which it is impossible to isolate the alkylene dithiocarbonate in good yields.

We have now found that the use of certain complex catalysts based on a hydrated alkali metal halide selected from lithium, sodium or potassium iodide, lithium or sodium bromide, or lithium chloride, enables the alkylene dithiocarbonate to be obtained in good yields from the reaction of an alkylene oxide with carbon disulfide.

The alkali metal halide is the essential constituent of all the catalysts which are used, according to the invention, in order to obtain reaction product mixtures having a very high alkylene dithiocarbonate content. It has also been found that the presence of water is beneficial to the reaction, which very probably obeys a mechanism of the ionic type; this water can be supplied to the reaction mixture by the use of an alkali metal halide in moist or hydrated form. However, the amount of water present in the system must not be excessive and it has been found that the optimum water content is between 2 and 12% by weight with respect to the amount of alkali metal halide used.

In most cases, the hydrated alkali metal halide alone is not a sufficiently active catalyst and we have further found that good catalytic activity can be obtained by the use of certain compounds as co-catalysts.

These co-catalysts are: sulfhydric acid, or mercaptans or thioethers, alkyl sulfonium halides added as such or formed in situ; alkali metal axanthates, or thiolates, thiocarbonates, thiocarbamates or sulfides of an alkali metal; polar solvents, such as alcohols or glycols, which are good solvents for the alkali metal halide.

Our experiments have shown that the most effective co-catalysts are xanthates which may either be added in that form to the reaction mixture or formed in situ during the reaction.

The temperature of the reaction must be maintained at from $+10°$ C. to 70° C., because at temperatures below 10° C. the reaction is very slow and poor, while at temperatures above 70° C. a number of undesirable secondary reactions occurs.

In order that the invention may be more fully understood, the following examples are given by way of illustration only.

Example 1

An autoclave maintained at 0° C. was charged with a mixture of 1 mol. of $CS_2$ saturated with $H_2S$ at 20° C. (i.e. 0.25% by weight) and 3 moles of ethylene oxide. 1.8 g. of 5% hydrated LiCl (i.e. lithium chloride containing 5% by weight of water) were added, the autoclave was shut, and agitation was commenced. The cooling liquid maintaining the autoclave at 0° C. was replaced by a flow of water thermostatically maintained at 25° C. The excess pressure in the autoclave rose to 1.5 kg./cm.². The temperature of the reaction mixture did not vary substantially and the excess pressure gradually dropped back towards 0 kg./cm.². The reaction lasted for 6 hours, by which time all the $CS_2$ had reacted. The autoclave was cooled to 0° C. Pressure in the autoclave was relieved, but there was substantially no evolution of gas, and the autoclave was emptied.

An orange-yellow liquid representing 98 to 99% of the initial mixture was collected and was found to contain: all the excess unreacted ethylene oxide; 1 to 2% of various impurities; and a remainder in the form of a mixture of ethylene dithiocarbonate, ethylene monothiocarbonate and ethylene episulfide.

All the $CS_2$ had reacted and for each mole of $CS_2$ there was collected (average over 9 experiments):

|  | Moles |
|---|---|
| Episulfide | 0.305 |
| Monothiocarbonate | 0.035 |
| Dithiocarbonate | 0.693 |

The dithiocarbonate yield was therefore about 70%. The composition of the reaction product obtained in all the experiments (and those reported below) was determined by gas-phase chromatography.

Example 2

The process of Example 1 was repeated but some of the experimental conditions were modified, i.e. the reaction time, the reaction temperature and the relative proportions of ethylene oxide and carbon disulfide.

The catalyst used was again lithium chloride hydrated with 5% water to which sulfhydric acid was added in admixture (at 0.25% by weight) with the carbon disulfide.

The results obtained are shown in Table 1.

TABLE 2

| K glycol xanthate (in moles) | Reaction time (hours) | Products obtained in mole per mole of $CS_2$ converted | |
|---|---|---|---|
| | | Propylene sulfide | Dithiocarbonate |
| 0.001 | 82 | | 0.812 |
| 0.0035 | 4 | 0.014 | 0.810 |
| 0.005 | 1 | 0.015 | 0.822 |
| 0.006 | 0.3 | 0.017 | 0.834 |

TABLE 1

| Reaction conditions | | | | | Products obtained in mole per mole of $CS_2$ converted | | |
|---|---|---|---|---|---|---|---|
| Quantity in moles of | | | | | | | |
| $CS_2$ saturated with $H_2S$ | Ethylene oxide | hydrated LiCl (g.) | Time (hrs.) | T. (° C.) | Ethylene sulfide | Monothiocarbonate | Dithiocarbonate |
| 1 | 2.5 | 1.8 | 4.5 | 25 | 0.220 | 0.04 | 0.655 |
| 1 | 2.5 | 1.8 | 6 | 25 | 0.345 | 0.025 | 0.705 |
| 1 | 2.5 | 1.8 | 7 | 25 | 0.530 | 0.020 | 0.573 |
| 1 | 2.5 | 1.8 | 15 | 25 | 0.280 | 0.05 | 0.813 |
| 1 | 2.5 | 1.8 | 21.5 | 25 | 0.300 | 0.054 | 0.73 |
| 1 | 15 | 9 | 5 | 60 | 0.05 | 0.059 | 0.832 |
| 5 | 1.5 | 1.8 | 15 | 25 | 0.144 | 0.03 | 0.640 |
| 3 | 9 | 5.4 | 15 | 25 | 0.140 | 0.044 | 0.876 |

The ethylene dithiocarbonate yield of the reaction was therefore always very much better than 60%.

Example 3

An alkyl sulfonium halide can be used as co-catalyst for hydrated lithium chloride. Alkyl sulfonium halides do not appear to be specific to the production of dithiocarbonate, since it has a greater tendency to promote the production of compounds such as ethylene monothiocarbonate or ethylene sulfide from carbon disulfide and ethylene oxide. However, if small quantities of this co-catalyst are used, considerable quantities of ethylene dithiocarbonate can be obtained.

The process of Example 1 was repeated using 3 moles of ethylene oxide, 1 mole of carbon disulfide, 0.05 mole of hydrated lithium chloride (11% of water) and 0.01 mole of triethylsulfonium iodide. The reaction temperature was 25° C. and the reaction time was 15 hours. Under these conditions the following were obtained in mole per mole of $CS_2$ converted:

| | Moles |
|---|---|
| Ethylene sulfide | 0.266 |
| Monothiocarbonate | 0.074 |
| Dithiocarbonate | 0.608 |

Example 4

An alkali metal glycol xanthate can be used as co-catalyst with hydrated lithium chloride.

The simplest method for the preparation of potassium glycol xanthate is gradually to add 1 mole of granular potash to 1.5 mole of glycol, the temperature of the medium being held below 50° C. when the mixture has the appearance of a thick syrup, it is cooled to 10° C. and 1 mole of carbon disulfide is added dropwise. The mixture is agitated for 4 hours at 10° C. and is then left to stand for about 12 hours at ambient temperature; the resulting precipitate is vacuum-filtered and then washed with ether and recrystallised from an alcohol-ether mixture.

The xanthate prepared in this way was used as a co-catalyst in the following reaction:

0.2 mole of carbon disulfide, 0.4 mole of epoxypropane, and 0.01 mole of hydrated lithium chloride (containing 10% water) and varying amounts of potassium glycol xanthate were placed in a three-necked flask having a reflux condenser and a thermometer. The reaction temperature was held at 25–27° C. for various reaction times. The results obtained are given in Table 2.

Example 5

The process of Example 4 was repeated with the following:

| | Moles |
|---|---|
| Carbon disulfide | 2 |
| Epoxy propane | 6 |
| 10% hydrated lithium chloride | 0.02 |
| Potassium glycol xanthate | 0.02 |

The temperature was held at 35–50° C. for 3 hours and the following were obtained per mole of converted carbon disulfide:

| | Moles |
|---|---|
| Propylene monothiocarbonate | 0.032 |
| Propylene dithiocarbonate | 0.947 |

When the epoxypropane in the above process was replaced by ethylene oxide, the following were obtained per mole of converted carbon disulfide:

| | Moles |
|---|---|
| Ethylene sulfide | 0.05 |
| Ethylene dithiocarbonate | 0.93 |

Example 6

Sodium trithiocarbonate $Na_2CS_3$ may be used as co-catalyst for the hydrated lithium chloride.

The following were used:

| | | |
|---|---|---|
| Carbon disulfide | moles | 0.5 |
| Propylene oxide | do | 1 |
| Lithium chloride containing 10% water | do | 0.02 |
| Anhydrous sodium trithiocarbonate | cc | 1.5 | and in 2 hours at a temperature of 35° C., a mixture was obtained which contained 61% of propylene dithiocarbonate and 31% of residual propylene oxide. The amount of propylene dithiocarbonate obtained represents a yield of 74% with respect to the carbon disulfide.

Example 7

A mixture consisting of 0.4 mole of propylene oxide and 0.2 mole of carbon disulfide was added dropwise to a flask containing a catalytic mixture consisting of 0.01 mole of sodium sulfide and 0.02 mole of 8% hydrated lithium chloride.

The temperature of the mixture rose to 40° C. and was then held at the reflux temperature of the propylene oxide simply by the addition of the reagents. The total addition of the reagents required ¾ of an hour and the reaction was then left to continue for three hours.

The propylene dithiocarbonate content of the resulting mixture was 70%, corresponding to a yield of 1 mole of dithiocarbonate per mole of converted carbon disulfide.

Example 8

0.1 cc. of a catalytic solution consisting of 50 g. of 10% hydrated sodium iodide dissolved in 10 g. of methanol, 0.2 mole of carbon disulfide and 2 cc. of propylene oxide were introduced into a 100 cc. flask provided with a condenser, a thermometer, a dropping funnel and a magnetic agitator. Since the reaction did not start, all the propylene oxide used in the process, i.e. a total of 0.4 mole, and 2 cc. of the catalytic solution, corresponding in all to 0.005 mole of sodium iodide, were added. The mixture was heated at 33° for 1 hour with reflux.

The propylene dithiocarbonate yield of the reaction was 90%, i.e. 0.9 mole of dithiocarbonate per mole of converted carbon disulfide.

With the same experimental technique and 0.005 mole of sodium glycol xanthate as the co-catalyst, the same yield was obtained with a faster reaction speed.

Example 9

0.02 mole of hydrated lithium chloride in the form of a solution prepared by dissolving 45 g. of 8% hydrated lithium chloride in 100 cc. of methanol, and 5 cc. of a mixture formed from 1 mole of carbon disulfide and 2 moles of propylene oxide were added with agitation to a flask. After 5 minutes, the temperature of the mixture was 50° C. The reactants were then added progressively in the proportion of 1 mole of carbon disulfide per 2 moles of propylene oxide so as to hold the reaction tempearture at 45–50° C.

The resulting mixture contained 0.848 mole of propylene dithiocarbonate per mole of converted carbon disulfide.

I claim:

1. A process for the preparation of alkylene dithiocarbonates comprising reacting carbon disulfide carbon disulfide with an alkylene oxide at a temperature of from 10 to 70° C. in the presence of a catalytic system consisting of an alkali metal halide selected from the group consisting of lithium iodide, sodium iodide, potassium iodide, lithium bromide, sodium bromide and lithium chloride, water in an amount of from 2 to 12% by weight based on the amount of alkali metal halide present and a co-catalyst selected from the group consisting of an alkylsulfonium halide, a xanthate, hydrogen sulfide, an inorganic alkali metal sulfide, a thiocarbonate and a lower alkanol.

2. The process of claim 1 wherein the co-catalyst is formed in situ.

3. The process of claim 1 wherein the co-catlyst is an alkysulfonium halide selected from the group consisting of trimethylsulfonium iodide, triethylsulfonium iodide and thriethylsulfonium bromide.

4. The process of claim 1 wherein the co-catalyst is a glycol xanthate.

5. The process of claim 4 wherein the glycol xanthate is potassium glycol xanthate.

6. The process of claim 1 wherein the co-catalyst is sodium sulfide.

7. The process of claim 1 wherein the co-catlyst is sodium trithiocarbonate.

8. The process of claim 1 wherein the co-catalyst is methanol.

9. The process of claim 3 wherein the alkali metal halide is lithium chloride and the water is present in an amount of from 5 to 11% by weight with respect to the amount of alkali metal halide present.

References Cited

UNITED STATES PATENTS 3,357,991  12/1967  Swakon _____ 260—327

JAMES A. PATTEN, *Primary Examiner.*